United States Patent Office 2,946,462
Patented July 26, 1960

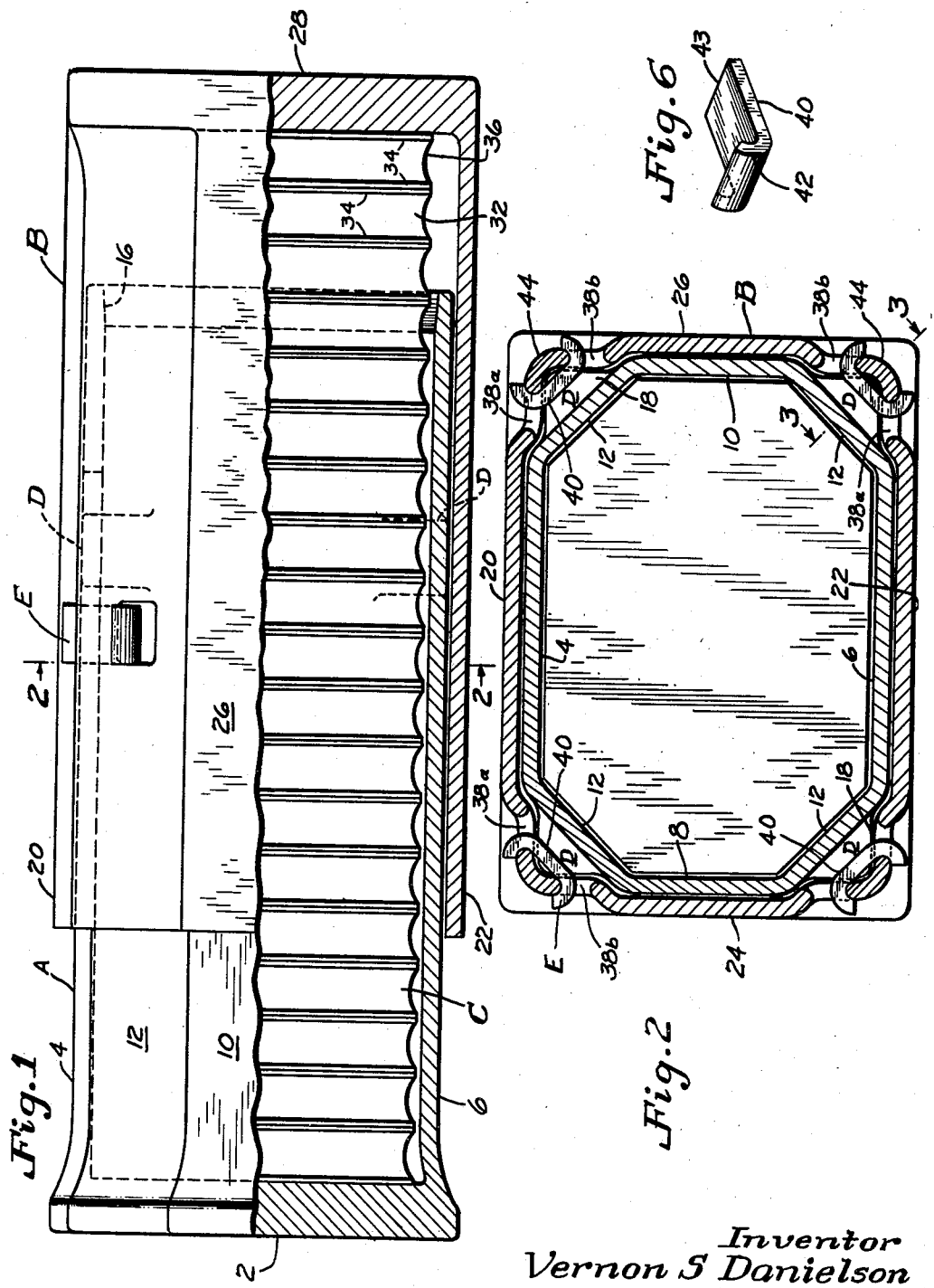
July 26, 1960 V. S. DANIELSON 2,946,462
SHOCK ABSORBING MECHANISMS
Filed Jan. 13, 1958 3 Sheets-Sheet 1
Inventor
Vernon S Danielson
By Edward F. Jurow
Atty.

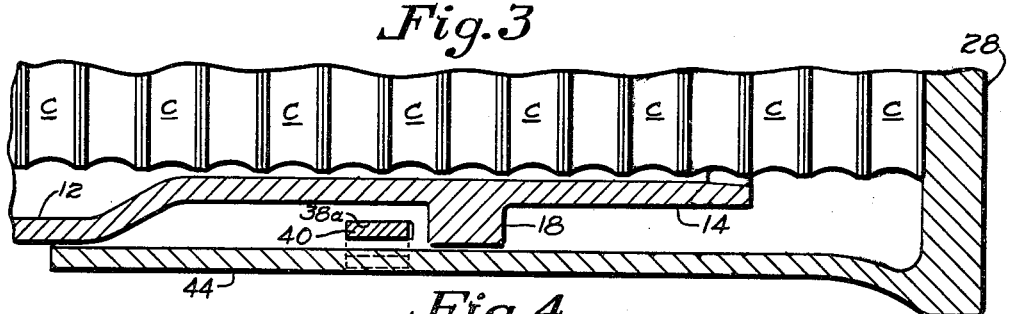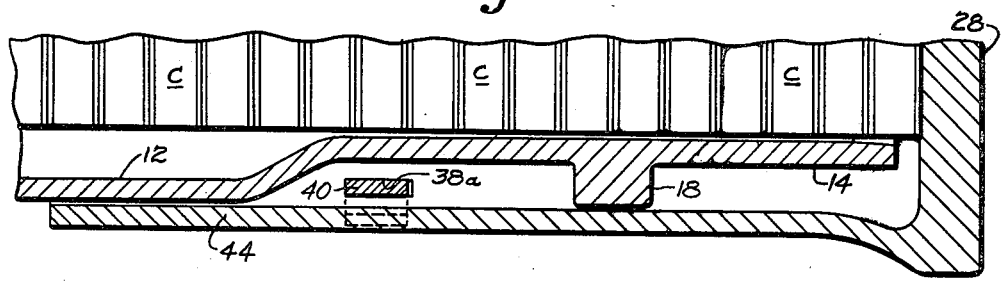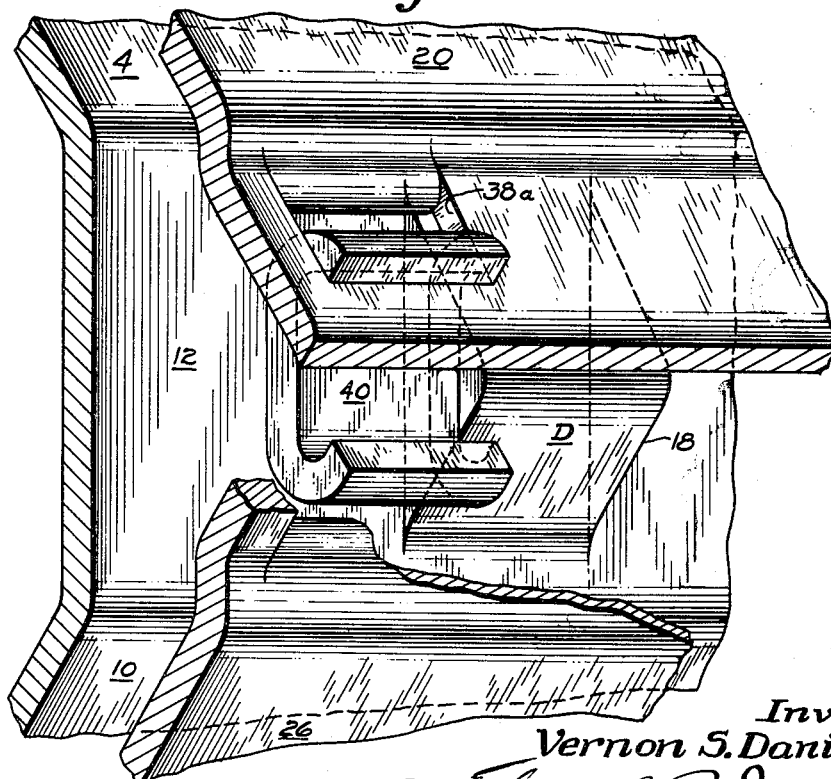

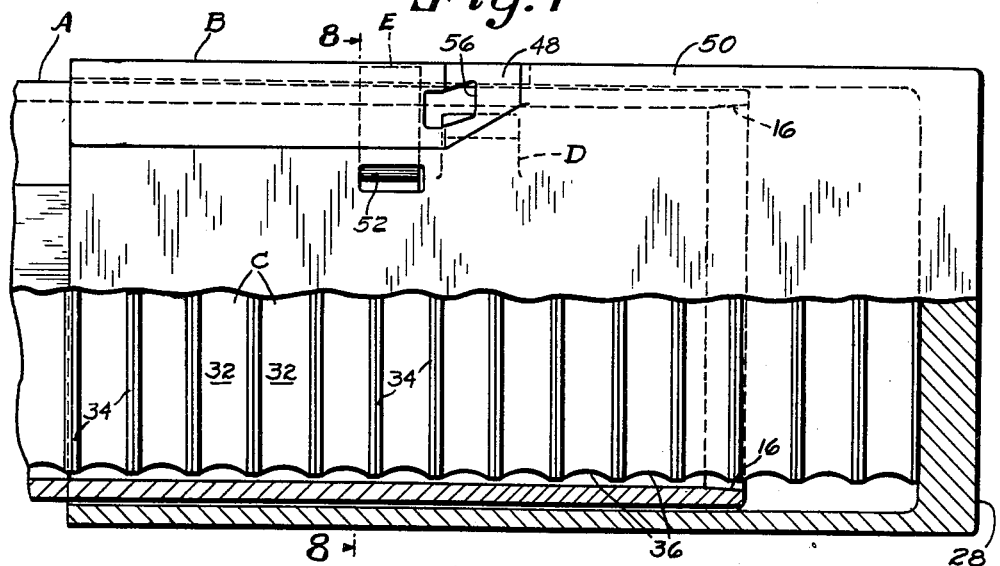
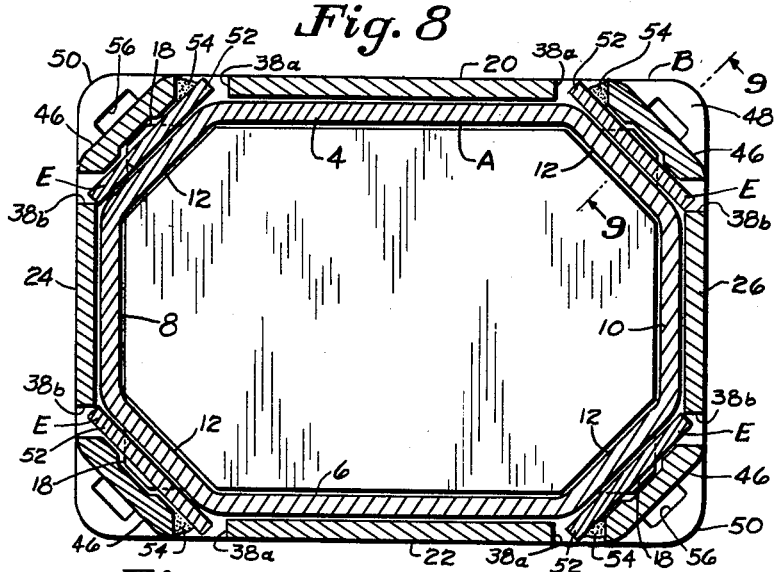
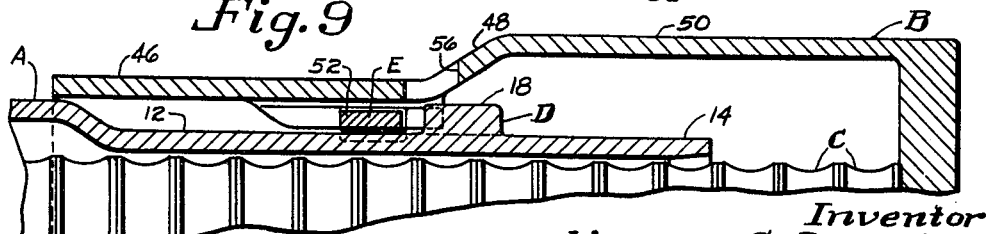

2,946,462

SHOCK ABSORBING MECHANISMS

Vernon S. Danielson, Chicago Heights, Ill., assignor to W. H. Miner, Inc., Chicago, Ill., a corporation of Delaware Filed Jan. 13, 1958, Ser. No. 708,637

4 Claims. (Cl. 213—7)

This invention relates to shock absorbing mechanisms and it has particular relation to shock absorbing mechanisms employing telescoping inner and outer housings and adapted for use as draft gears in railway cars.

In shock absorbing mechanisms, such as a draft gear, employing telescoping inner and outer casings which house the impact absorbing or dissipating means, some form of structure is generally provided to maintain the two casings in telescoped assembled condition during shipment from the factory and prior to installation of the draft gear in a railway car, and to also maintain such assembled condition in the event the draft gear is removed from the car for repair of the car or for other reasons. One known form of retaining means comprises the use of ears upstanding from the sides of the casings and having longitudinally aligned holes through which a bolt may be passed and secured by a mating nut.

It is an object of the invention to provide an improved retaining means for maintaining assembly of the inner and outer casings of a draft gear that is of simple construction, is easily applied, offers no substantial projections beyond the sides of the casings, and securely maintains the casings in assembled condition.

A further object of the invention is to maintain assembly of telescopable inner and outer casings of a draft gear by providing an integral lug projecting laterally and outwardly from a wall section of the inner housing, which lug is abutable in the assembled condition of the housings with a retaining key secured in a pair of slots in the outer housing.

Other objects of the invention will, in part, be obvious and in part appear hereinafter.

This invention is disclosed in the embodiments thereof shown in the accompanying drawings and it comprises the features of construction, combination of elements and arrangement of parts which will be exemplified in the constructions hereinafter set forth and the scope of the application as indicated in the appended claims.

For a more complete understanding of the nature and scope of the invention, reference can be had to the following detailed description, taken together with the accompanying drawings, in which:

Figure 1 illustrates a complete draft gear with portions broken away to show a stack of rubber pads interiorly thereof;

Figure 2 is a sectional view on line 2—2 of Figure 1;

Figure 3 is a partial cross-sectional view along line 3—3 of Figure 2;

Figure 4 is a view similar to Figure 3 but showing the inner housing fully telescoped within the outer housing;

Figure 5 is a perspective illustration, with portions broken away, of the retaining key of Figures 1 through 4 and the related retaining lug;

Figure 6 is another perspective view of the key of Figure 5 and showing the key with one end preformed into curved condition;

Figure 7 is similar to Figure 1 and partially shows a draft gear illustrating a second embodiment of the retaining means according to the invention;

Figure 8 is a sectional view along the line 8—8 of Figure 7; and

Figure 9 is a partial view along the line 9—9 of Figure 8.

As illustrated in Figures 1 through 6 and Figures 7, 8 and 9, the shock absorbing mechanism of this invention comprises an inner housing generally designated as A telescopically movable within an outer housing B. Disposed within the housing A and extending into housing B is a pre-stressed stack of rubber units C. Retaining lugs D are provided on the inner housing adapted to engage retaining keys E.

The inner casing A comprises a front wall 2 integral with a top 4, a bottom 6 and side walls 8 and 10. Diagonal walls 12 likewise integral with front wall 2 join the respective side and bottom walls and the side and top walls. The end of the casing A remote from front wall 2 is open for the reception of the rubber units C. Adjacent to the open end, the casing A is provided with a terminal portion 14 which is beveled, as at 16, to facilitate inward movement of the housing A and prevent undesired binding with edges of the units C.

A triangular retaining lug 18 projects laterally outwardly from at least one of the diagonal walls 12 of the inner housing and preferably extends from each diagonal wall so that four retaining lugs 18 are provided, as best illustrated in Figures 2 and 8, to achieve strength and symmetry. Of course, if desired, only two lugs 18 need be provided, one at each diagonally opposed wall 12.

The outer housing B is similar to that of the inner housing A in that it accommodates the latter, including lugs 18, for telescoping relationship therewith. The outer housing B comprises integral top, bottom and side walls 20, 22, 24 and 26. The rear end of the outer housing is closed by an integral rear wall 28 while the opposite end of the housing B has an opening for the reception of the inner housing A.

The units C comprise a pad of rubber 32 having metal plates 34 bonded to the faces thereof and having an undercut periphery 36 creating a space into which displaced rubber may flow, during compression of the unit, without abrasion of the rubber against the inner surfaces of the housing A or against the inner surfaces of the portions 30. Due to the initial compression of the units C, upon being assembled and enclosed in the inner and outer housings, the rearmost units C will maintain alignment with the remaining units disposed within the inner housing A, as seen in Figure 1. However, if desired, mating protuberances and seats (not shown) may be provided in a well known manner in the adjacent engaged metal plates 34 to thus positively assure alignment of the rearmost units C with the other units.

Referring now specifically to the embodiment shown in Figures 1 through 5, a pair of slots 38a and 38b is provided adjacent to each corner of the outer housing where the side walls 24, 26 merge with the top and bottom walls 20, 22, respectively. The location of the slots 38a and 38b is such that a linear member can be extended through the slot 38a in the top wall 20 and through the slot 38b immediately adjacent thereto in the side wall 24. If both ends of such linear member are then deformed or bent, the member will assume substantially the form of the retaining key 40 shown in Figure 2 or Figure 5. It is preferred to empoly a retaining key 40 which is partially preformed into the shape it will have in its final condition. As shown in Figure 6, the key 40 is provided initially with one curved end portion, such as 42, while the opposite end 43 is straight. The straight end 43 is inserted through a pair of slots 38a and 38b to seat the curved end 42 against the intervening metal web 44 of the outer housing. The projecting straight end 43 is then deformed in any convenient manner, as by use of a hydraulic press, to curve around the opposite edge of said intervening web 44 and assume the shape shown in Figure 5 and secure the key 40 in position.

Figure 2 shows that the side corners of the outer housing B are somewhat depressed out of the plane of the surface of the top, bottom and side walls proper. This depression provides space for the ends 42 and 43 of the retaining keys 40 and prevents projection of same into contact with the center sill surfaces or other confining surfaces of a railroad car.

Referring now specifically to Figures 7, 8 and 9, wherein the same reference numbers are used, where appropriate, for the like parts illustrated in the embodiment of Figures 1 through 6, the side walls 24, 26 of the outer housing B are integrally joined to the top wall 20 and the bottom wall 22 by diagonal corner walls 46 which extend rearwardly for a portion only of the length of the outer housing and merge with beveled shoulder sections 48, which, in turn, merge into true corner sections 50 formed by the juncture of the side walls with the top and bottom walls. The corner sections 50 are preferably of the rounded form illustrated.

A pair of slots 38a and 38b are provided adjacent to each diagonal corner wall 46, forwardly (to the left in Figure 7) of the beveled shoulder section 48, and positioned in the side and top walls or in the side and bottom walls to accommodate a straight key 52. As will be seen from Figure 8, each key 52 extends through a slot 38a and partially extends into slot 38b to provide an abutment for contact with the retaining lug 18 which extends laterally outwardly from the diagonal wall 12 of the inner housing. As shown, the keys 52 are secured in position by welds 54.

An opening 56 is provided partially in the beveled shoulder section 48 and partly in the diagonal corner wall 46 for facilitating the placement of a spacer block (not shown) between the key 52 and the lug 18 when it is desired to maintain the draft gear in a shortened condition.

To assemble the gear, the inner housing A is placed in an upstanding position, open end uppermost, the rubber units C are stacked therein, the outer housing B is then telescoped over the inner housing until the slots 38a and 38b are below the retaining lugs 18 on the inner housing, thereby pre-stressing or placing the units C under an initial compression. The assembly is maintained in this position and, in the case of the embodiment of Figures 1 through 6, preformed retaining keys 40 are inserted through the pairs of slots 38. The keys 40 are then secured in the slots 38 by deforming their ends 43 into the curved form shown to wrap them around the intervening web 44 of the outer housing B.

In the case of the embodiment of Figures 7 through 9, straight retaining keys 52 are inserted through the slots 38a into engagement with an edge or corner of an adjacent slot 38b and are then tack-welded in position.

In order to maintain the inner casing A in a depressed condition for ease of installation of the draft gear within the center sill pocket of a railway car, a spacer of frangtible material (not shown) is inserted between the retaining lugs 18 and the retaining keys 40 or 52. Thus, the gear would appear as shown in Figure 1 or Figure 7 of the drawings. After the gear has been installed in the center sill pocket of a railroad car, operation or closure of the gear will cause the frangible spacer to disintegrate or to drop out of position.

From the foregoing description it will be observed that this invention provides an efficient structure for retaining the telescopable inner and outer housings of a draft gear in assembled position prior to application thereof in the center sill pocket of a railway car.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim:

1. In a draft gear comprising inner and outer telescopable casings housing resilient means, of retaining means comprising one or more lugs integral with and projecting laterally from one of the casing, a corresponding number of pairs of juxtaposed slots in the other casing, and a retaining key secured in each of said pairs of slots in the path of movement of said lugs when said casings move away from each other.

2. A shock absorbing mechanism comprising an open-ended first casing having top, bottom and side walls integral with a front panel and having diagonal corner walls joining the top and side walls and the bottom and side walls, lugs projecting laterally outwardly from said diagonal walls in proximity to the open end of said first casing; a second open-ended casing telescopically receiving said first casing and having top, bottom and side walls integral with each other and integral with a rear panel, pairs of juxtaposed slots provided in proximity to the side corners of said second casing, each slot of a pair of slots being located in a different wall of said second casing; a retainer extending through each pair of slots, and resilient means housed within said first and second casings.

3. A shock absorbing mechanism comprising an open-ended first casing having top, bottom and side walls integral with a front panel and having diagonal corner walls joining the top and side walls and the bottom and side walls, triangular lugs projecting laterally outwardly from said diagonal walls in proximity to the open end of said first casing; a second open-ended casing telescopically receiving said first casing and having top, bottom and side walls integral with each other to form corner sections and integral with a rear panel, pairs of juxtaposed slots at said corner sections of said second casing, each slot of a pair of slots being located in a different wall of said second casing; a retaining key extending through each pair of slots into the path of movement of the lugs and embracing the intervening corner section of said second casing, and resilient means housed within said first and second casings.

4. A shock absorbing mechanism comprising an open-ended first casing having top, bottom and side walls integral with a front panel and having diagonal corner walls joining the top and side walls and the bottom and side walls, triangular lugs projecting laterally outwardly from said diagonal walls in proximity to the open end of said first casing; a second open-ended casing telescopically receiving said first casing and having top, bottom and side walls integral with diagonal corner walls and integral with a rear wall panel, pairs of juxtaposed slots in said second casing, each slot of a pair of slots being located in a different wall; a retaining key extending through each pair of slots parallel to the diagonal corner walls and in the path of movement of the lugs, and resilient means housed within said first and second casings.

References Cited in the file of this patent

UNITED STATES PATENTS

| | | |
|---|---|---|
| 1,171,722 | Hough | Feb. 15, 1916 |
| 2,216,473 | Hobson | Oct. 1, 1940 |
| 2,731,259 | Dentler | Jan. 17, 1956 |
| 2,787,384 | Forsell | Apr. 2, 1957 |